(12) United States Patent
Pauken et al.

(10) Patent No.: US 8,297,667 B2
(45) Date of Patent: Oct. 30, 2012

(54) LOCKABLE LATCH

(75) Inventors: Junko Pauken, Canton, MI (US);
Charles Alan Rocco, Milford, MI (US);
Michael James Whitens, Novi, MI (US)

(73) Assignee: Ford Global Technologies, LLC,
Dearborn, MI (US)

( * ) Notice: Subject to any disclaimer, the term of this patent is extended or adjusted under 35 U.S.C. 154(b) by 602 days.

(21) Appl. No.: 12/480,315

(22) Filed: Jun. 8, 2009

(65) Prior Publication Data
US 2010/0308604 A1 Dec. 9, 2010

(51) Int. Cl.
*E05C 3/02* (2006.01)
*E05C 3/00* (2006.01)

(52) U.S. Cl. ............ 292/169.14; 292/194; 292/80; 292/83; 292/246; 24/600.9; 24/601.4; 24/625

(58) Field of Classification Search ......... 292/80–89, 292/104, 107, 169.14, 194, 246; 24/265 H, 24/369, 598.7, 599.1, 600.9, 601.4, 625; 70/208, 210, DIG. 73
See application file for complete search history.

(56) References Cited

U.S. PATENT DOCUMENTS

| | | | |
|---|---|---|---|
| 160,266 A | 3/1875 | Haynes | |
| 370,983 A | 10/1887 | Stahl | |
| 424,637 A * | 4/1890 | Anderson | 24/601.1 |
| 467,399 A * | 1/1892 | Covert | 24/601.6 |
| 738,000 A | 9/1903 | Carpenter | |
| 940,738 A * | 11/1909 | Schleicher | 59/95 |
| 978,656 A * | 12/1910 | Schleicher | 24/600.9 |
| 1,092,238 A * | 4/1914 | Baxter | 24/599.6 |
| 1,180,387 A * | 4/1916 | Farrand | 24/599.4 |
| 1,350,787 A | 8/1920 | Darkes | |
| 1,538,989 A * | 5/1925 | Hancock | 24/600.9 |
| 1,677,592 A * | 7/1928 | Lloyd | 24/600.9 |
| 1,772,390 A | 8/1930 | Evans | |
| 1,944,475 A * | 1/1934 | Stowell | 24/600.9 |
| 2,010,733 A * | 8/1935 | Netz | 294/82.19 |
| 2,187,441 A * | 1/1940 | Baxter | 24/600.9 |
| 4,122,585 A | 10/1978 | Sharp et al. | |
| 4,158,907 A | 6/1979 | Spinosa et al. | |
| 4,441,345 A * | 4/1984 | Guarr | 70/240 |
| 4,492,386 A | 1/1985 | Roberts | |
| 4,912,950 A | 4/1990 | Crowle | |
| 4,927,200 A | 5/1990 | Wilkins | |
| 5,257,441 A | 11/1993 | Barlow | |
| 5,383,257 A * | 1/1995 | Krauss | 24/625 |
| 5,548,879 A * | 8/1996 | Wu | 24/625 |
| 5,996,865 A | 12/1999 | Bissey | |
| 6,145,172 A * | 11/2000 | Bourdon | 24/625 |
| 6,494,535 B2 | 12/2002 | Galbreath | |
| 6,539,595 B1 * | 4/2003 | Benedict | 24/633 |
| 6,651,467 B1 * | 11/2003 | Weinerman et al. | 70/208 |
| 6,681,969 B1 | 1/2004 | Giedeman, III et al. | |
| 6,802,109 B2 | 10/2004 | Hede et al. | |

(Continued)

*Primary Examiner* — Carlos Lugo
(74) *Attorney, Agent, or Firm* — Raymond L. Coppiellie; Price Heneveld LLP

(57) ABSTRACT

A lockable latch system includes an anchor bar rigidly connected to a vehicle and a rigid hook operably engaged with the anchor bar. A springboard is disposed on the rigid hook. The springboard is operable between an obstructing position, wherein the springboard prevents disengagement of the rigid hook from the bar and an unobstructing position, wherein the springboard does not prevent disengagement of the rigid hook from the bar. A lock assembly includes a cam operable between an interference position, wherein the cam prevents the springboard from entering the unobstructing position and a non-interference position, wherein the cam does not prevent the springboard from entering the unobstructing position.

19 Claims, 5 Drawing Sheets

U.S. PATENT DOCUMENTS

| | | |
|---|---|---|
| 6,931,309 B2 | 8/2005 | Phelan et al. |
| 7,080,032 B2 | 7/2006 | Abbs et al. |
| 7,104,095 B1 | 9/2006 | Lin |
| 7,338,120 B2 * | 3/2008 | Gastaldi ................. 297/253 |
| 7,484,800 B2 | 2/2009 | Duffy et al. |
| 2002/0011505 A1 | 1/2002 | Cole et al. |
| 2004/0217615 A1 | 11/2004 | Lindstrom et al. |
| 2007/0226967 A1 | 10/2007 | Woods |

* cited by examiner

LOCKABLE LATCH

FIELD OF THE INVENTION

The present invention generally concerns a lockable latch, and more particularly relates to a lockable ISOFIX latch assembly.

BACKGROUND OF THE PRESENT INVENTION

ISOFIX latch systems are generally used to secure items, such as child car seats inside a vehicle.

SUMMARY OF THE PRESENT INVENTION

One aspect of the present invention includes a lockable latch system for a vehicle. The lockable latch system includes an anchor bar rigidly connected to a vehicle and a rigid hook operably engaged with the anchor bar. A springboard is disposed on the rigid hook. The springboard is operable between an obstructing position, wherein the springboard prevents disengagement of the rigid hook from the bar and an unobstructing position, wherein the springboard does not prevent disengagement of the rigid hook from the bar. A lock assembly includes a cam operable between an interference position, wherein the cam prevents the springboard from entering the unobstructing position and a non-interference position, wherein the cam does not prevent the springboard from entering the unobstructing position.

Another aspect of the present invention includes a lockable latch. The lockable latch has a rigid hook defining a bar receiving portion. A flexible springboard is disposed in the bar receiving portion. The springboard is capable of flexing between an obstructing position, wherein the springboard substantially blocks the bar receiving portion and an unobstructing position, wherein the springboard does not substantially block the bar receiving portion. A lock assembly includes a cam operable between an interference position, wherein the cam prevents the springboard from entering the unobstructing position and a non-interference position, wherein the cam does not prevent the springboard from entering the unobstructing position.

Yet another aspect of the present invention includes a method for locking a vehicle restraining latch to a vehicle. A rigid hook is formed having a bar receiving portion. A springboard is connected to the rigid hook. The spring board is operable between an obstructing position, wherein the springboard substantially blocks the bar receiving portion and an unobstructing position, wherein the springboard does not substantially block the bar receiving portion. A lock assembly is operably connected to the rigid hook. A cam is formed on the lock assembly. The cam is operable between an interference position, wherein the cam prevents the springboard from entering the unobstructing position and a non-interference position, wherein the cam does not prevent the springboard from entering the unobstructing position. The rigid hook is operably engaged with an anchor bar of a vehicle. The springboard is positioned in the obstructed position. The cam is positioned in the interference position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
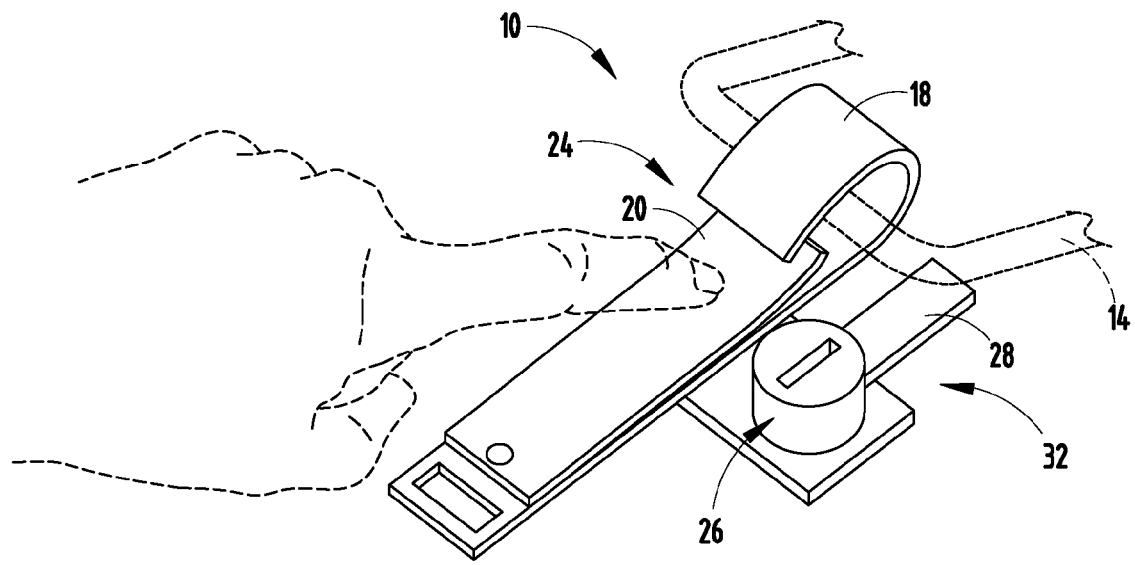
FIG. 1 is a top perspective view of one embodiment of a lockable ISOFIX latch in an unlocked position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
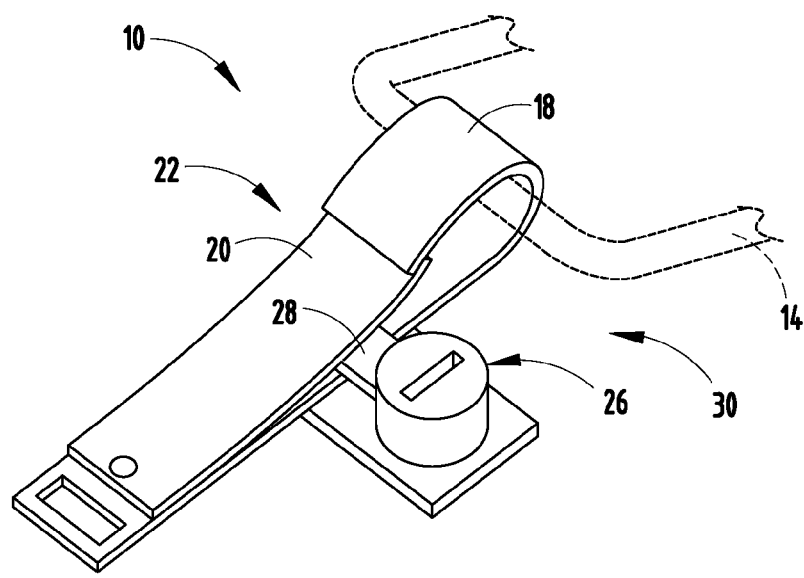
FIG. 2 is a top perspective view of the lockable ISOFIX latch of FIG. 1 in a locked position.

Referring to FIGS. 1 and 2, the reference numeral 10 generally designates a lockable latch system for a vehicle seat 12 including an anchor bar 14 rigidly connected to the vehicle seat 12. A rigid hook 18 is operably engaged with the anchor bar 14. A springboard 20 is disposed on the rigid hook 18. The springboard 20 is operable between an obstructing position 22, wherein the springboard 20 prevents disengagement of the rigid hook 18 from the anchor bar 14 and an unobstructing position 24, wherein the springboard 20 does not prevent disengagement of the rigid hook 18 from the anchor bar 14. A lock assembly 26 has a cam 28 operable between an interference position 30, wherein the cam 28 prevents the springboard 20 from entering the unobstructing position 24 and a non-interference position 32, wherein the cam 28 does not prevent the springboard 20 from entering the unobstructing position 24.

Figure 3:
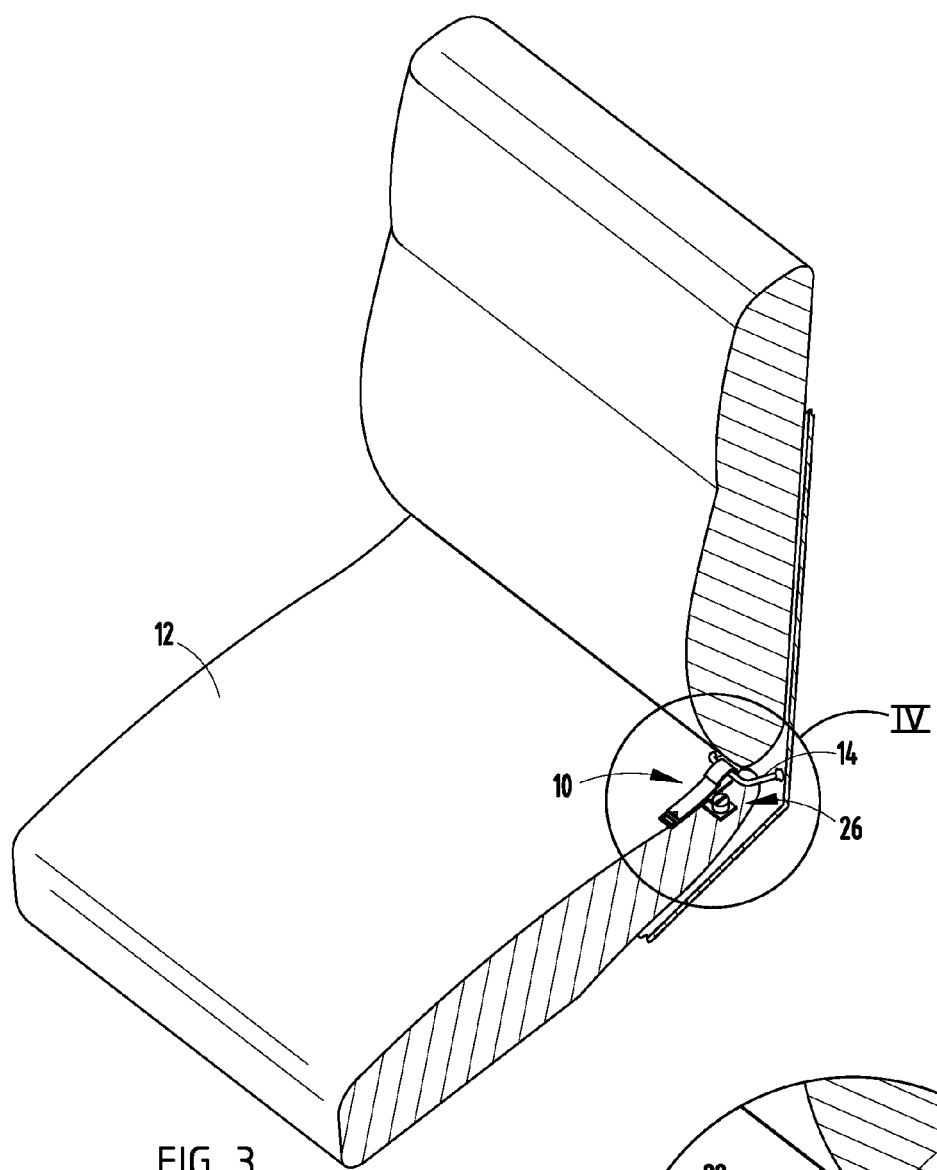
FIG. 3 is a top perspective view of the lockable ISOFIX latch secured with an anchor bar.
Figure 4:
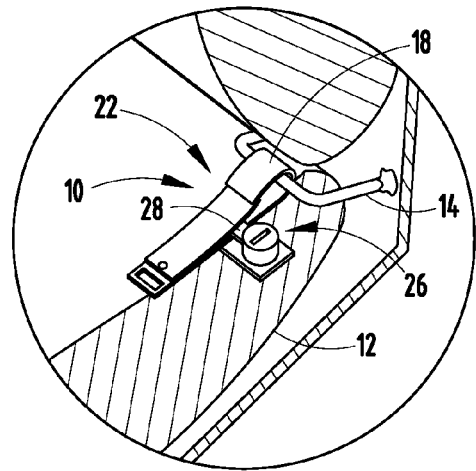
FIG. 4 is an enlarged top perspective view of area IV of FIG. 3.

As shown in FIGS. 3 and 4, the lockable ISOFIX latch is adapted for secure engagement with the anchor bar 14 that extends between a backrest and the vehicle seat 12. The lockable ISOFIX latch can be used to secure various items, including lockboxes, child seats, computer laptops, etc.

Figure 5:
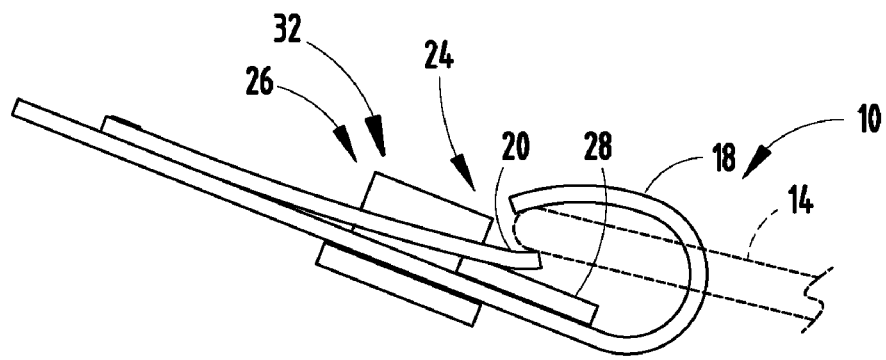
FIG. 5 is a side elevational view of the lockable ISOFIX latch prior to engagement with an anchor bar.
Figure 6:
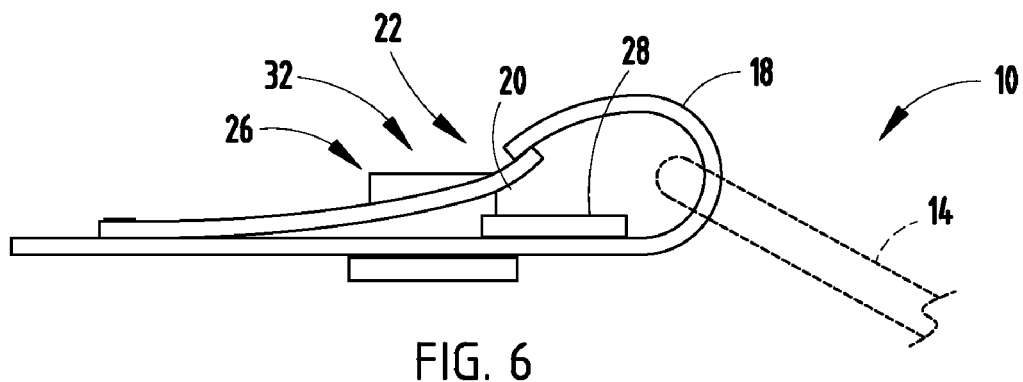
FIG. 6 is a side perspective view of the lockable ISOFIX latch engaged with an anchor bar but unlocked.
Figure 7:
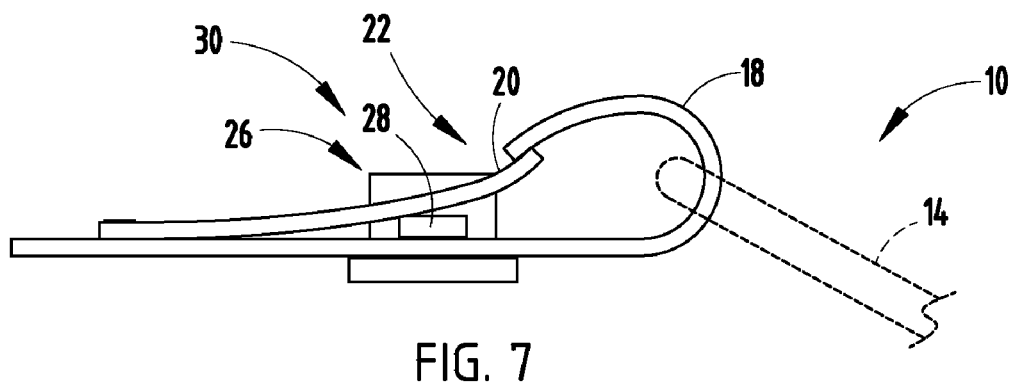
FIG. 7 is a side elevational view of the lockable ISOFIX latch engaged with an anchor bar and locked.

Referring now to FIGS. 5-7, to install the lockable ISOFIX latch on the anchor bar 14, the rigid hook 18 is inserted into the opening defined by the anchor bar 14. It will be understood by one having ordinary skill in the art that the lockable ISOFIX latch could be hooked under the anchor bar 14 or over the anchor bar 14. The anchor bar 14 is used to force the springboard 20 to a downward position out of interference with an opening defined between the hook 18 and the springboard 20. Alternatively, a user could apply pressure to the springboard 20, thus moving the springboard 20 out of the obstructing position 22 so that the anchor bar 14 can be engaged with the hook 18. After the anchor bar 14 and hook 18 of the lockable ISOFIX latch are engaged, the springboard 20, which is biased into contact with a distal end of the hook 18, returns to the obstructing position 22. Now, for the lockable ISOFIX latch to become disengaged from the anchor bar 14, a force, such as that applied by the thumb of a user, on the springboard 20 is needed to provide adequate space between the distal end of the hook 18 and the springboard 20 so that the anchor bar 14 can become disengaged from the hook 18.

Figure 8:
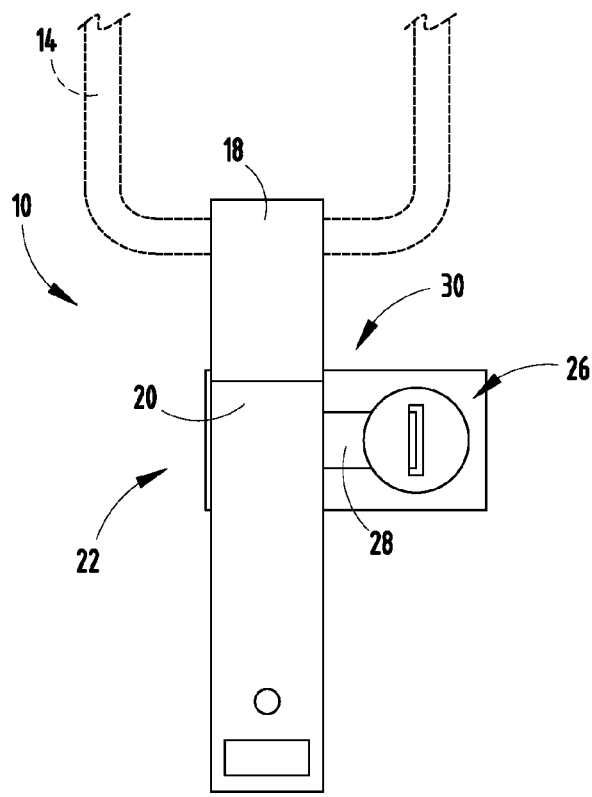
FIG. 8 is a top elevational view of the lockable ISOFIX latch of FIG. 7.
Figure 9:
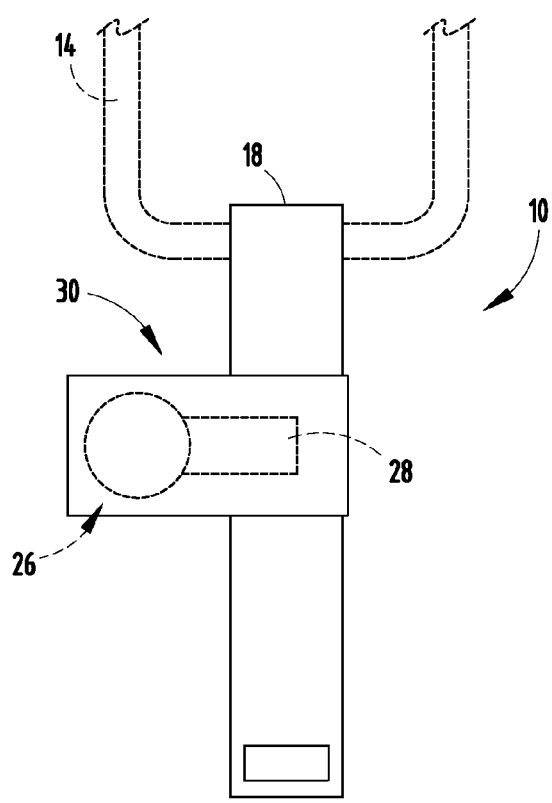
FIG. 9 is a bottom elevational view of the lockable ISOFIX latch of FIG. 7.

In the event the user wishes to prevent a force from being applied to the springboard 20 that would allow adequate space between the distal end of the hook 18 and the springboard 20 for the anchor bar 14 to become disengaged from the hook 18, the user can operate the lock assembly 26 and rotate the cam 28 into position on a bottom side of the springboard 20. After the cam 28 has been rotated into position between the hook 18 and the springboard 20, the springboard 20 cannot be forced to a downward position that would allow adequate space between the distal end of the hook 18 and the springboard 20. Accordingly, the lockable ISOFIX latch is now locked. As shown in FIG. 8, the lockable ISOFIX latch may be designed to receive a key that allows rotation of the cam 28 between the interference position 30 and the non-interference position 32. The lock assembly 26 is connected to the lockable ISOFIX latch by a platform welded or otherwise connected to a bottom portion of the lockable ISOFIX latch.

Figures 10, 11:
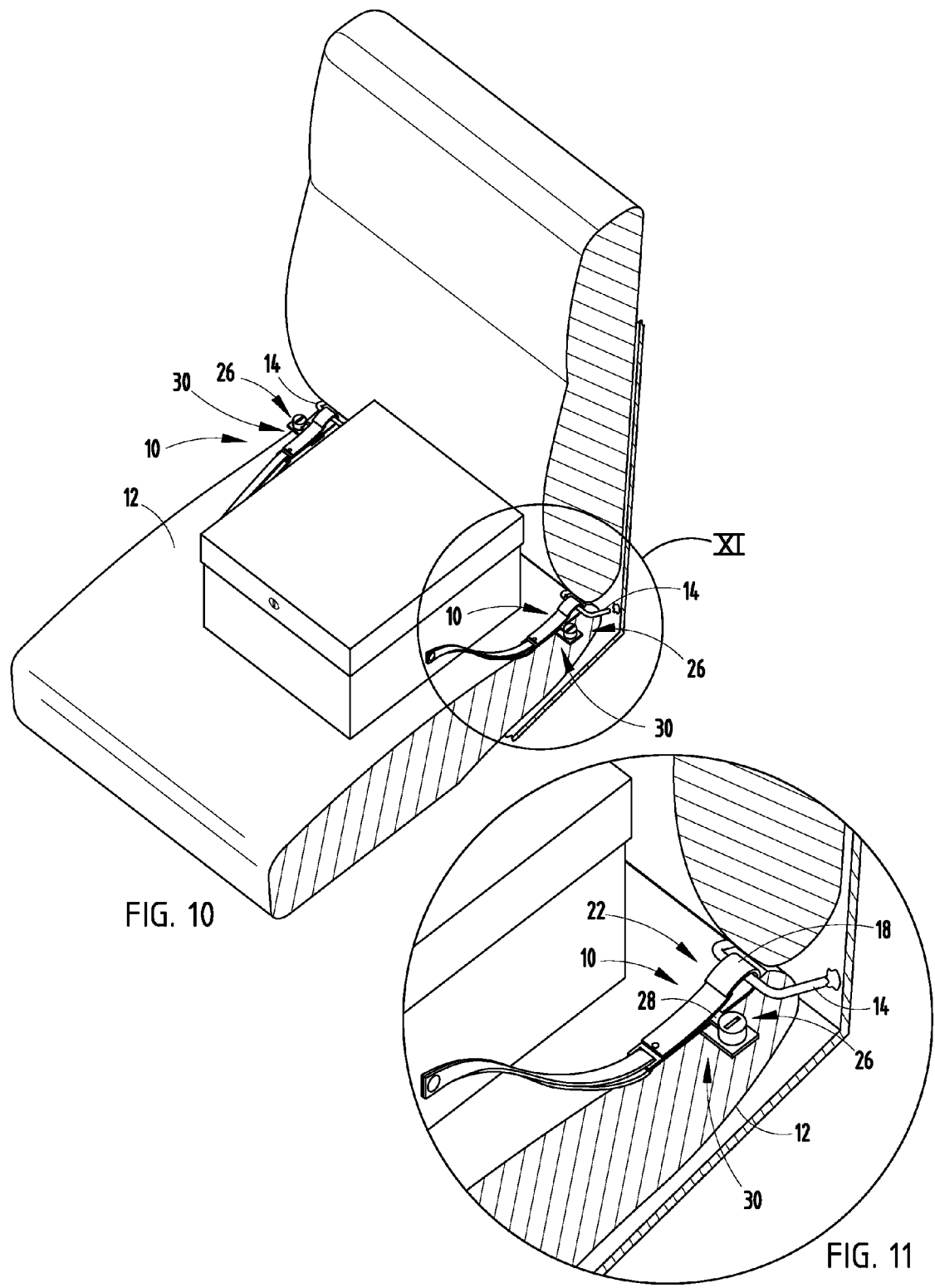
FIG. 10 is a top perspective view of the lockable ISOFIX latch securing a lockbox on a vehicle seat.
FIG. 11 is an enlarged top perspective view of the area XI of FIG. 10.

Referring now to FIGS. 10 and 11, in one embodiment of the lockable ISOFIX latch system 10, the lockable ISOFIX latch is locked to secure a lockbox to the vehicle seat 12. To remove the lockbox, a user would first move the lock assembly 26 from the interference position 30 to the non-interference position 32, which consequently rotates the cam 28 out of contact with the springboard 20. After the cam 28 is no longer in contact or adjacent to the springboard 20, the user may apply force to the springboard 20 to create an opening between the distal end of the hook 18 and the springboard 20 that allows space for the anchor bar 14 to be withdrawn, and thus disengage from the lockable ISOFIX latch.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A lockable latch system for a vehicle comprising:
an anchor bar rigidly connected to a vehicle;
a rigid hook having an attachment end and a latching end for engaging the anchor bar;
a springboard having a mounting end attached to the attachment end of the rigid hook and an opposite end configured to engage with the latching end of the rigid hook, the springboard being operable between an obstructing position wherein the springboard prevents disengagement of the rigid hook from the bar, and an unobstructing position wherein the springboard does not prevent disengagement of the rigid hook from the bar; and
a lock assembly connected to the rigid hook and having a cam rotatable between an interference position wherein the cam is rotated along a plane substantially parallel to the attachment end of the rigid hook, abutting an underside of the springboard to prevent the springboard from moving to the unobstructing position and a non-interference position wherein the cam is rotated away from the underside of the springboard and does not prevent the springboard from moving to the unobstructing position.

2. The lockable latch system of claim 1, wherein the cam rotates approximately 90 degrees between the obstructed and unobstructed positions.

3. The lockable latch system of claim 2, wherein the cam of the lock assembly is rotated by a key.

4. The lockable latch system of claim 1, wherein the lock is assembly is attached to a plate fixedly connected to the rigid hook.

5. The lockable latch system of claim 1, further comprising:
a flexible belt attached to the rigid hook.

6. The lockable latch system of claim 5, further comprising:
a lock box connected with the flexible belt.

7. A lockable latch comprising:
a hook defining a receiving portion;
a springboard attached to the hook and having an end configured obstruct passage to the receiving portion, and capable of being flexed to unobstruct the passage to the receiving portion; and
a key and lock assembly having a cam rotatable along a plane substantially parallel to the springboard end and configured to move between an interference position between the hook and springboard preventing movement of the springboard and a non-interference position allowing movement of the springboard.

8. The lockable latch of claim 7, wherein the cam abuts an underside of the springboard when the cam is in the interference position.

9. The lockable latch of claim 7, wherein the cam rotates approximately 90 degrees between the interference and non-interference positions.

10. The lockable latch of claim 7, wherein the key and lock assembly is attached to a plate fixedly connected to the rigid hook.

11. The lockable latch of claim 7, further comprising:
a flexible belt attached to the rigid hook.

12. The lockable latch of claim 11, further comprising:
a lock box connected with the flexible belt.

13. A method for locking a vehicle restraining latch to a vehicle, the method comprising:
forming a rigid hook having a bar receiving portion;
connecting a springboard to the rigid hook, the springboard having an end configured to block the bar receiving portion;
operating the springboard between an obstructing position wherein the springboard blocks the bar receiving portion and an unobstructing position wherein the springboard does not block the bar receiving portion;
operably connecting a lock assembly to the rigid hook;
forming a cam on the lock assembly that is rotatable along a plane substantially parallel to the springboard end and operable between an interference position wherein the cam abuts an underside of the springboard and prevents the springboard from moving to the unobstructing position and a non-interference position wherein the cam is rotated away from the underside of the springboard and does not prevent the springboard from moving to the unobstructing position;
operably engaging the rigid hook with an anchor bar of a vehicle;
positioning the springboard in the obstructed position; and
positioning the cam in the interference position.

14. The method of claim 13, the step of operating the springboard further comprising:

flexing the springboard to bias the springboard to the obstructed position.

15. The method of claim 13, wherein the cam rotates approximately 90 degrees between the interference and non-interference positions.

16. The method of claim 13, further comprising:

rotating the cam to abut an underside of the springboard when the cam is in the interference position.

17. The method of claim 13, further comprising:

attaching the lock assembly to a plate that is fixedly connected with the rigid hook.

18. The method of claim 15, the step of rotating the cam approximately 90 degrees further comprising:

rotating the cam with a key adapted to operate with the lock assembly.

19. The method of claim 18, further comprising:

locking the cam in the interference position.

* * * * *